United States Patent
Wu (10) Patent No.: US 9,438,414 B2
(45) Date of Patent: Sep. 6, 2016

(54) VIRTUALIZED SHA COMPUTATIONAL ENGINE

(71) Applicant: Advanced Micro Devices, Inc., Sunnyvale, CA (US)

(72) Inventor: Winthrop J Wu, Shrewsbury, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 201 days.

(21) Appl. No.: 14/058,102

(22) Filed: Oct. 18, 2013

(65) Prior Publication Data

US 2015/0110264 A1    Apr. 23, 2015

(51) Int. Cl.
*H04L 9/06* (2006.01)

(52) U.S. Cl.
CPC ......... *H04L 9/0643* (2013.01); *H04L 2209/12* (2013.01)

(58) Field of Classification Search
None
See application file for complete search history.

(56) References Cited

U.S. PATENT DOCUMENTS

| | | | | |
|---|---|---|---|---|
| 2002/0108048 A1* | 8/2002 | Qi | ......................... | H04L 9/0625 713/189 |
| 2002/0199101 A1* | 12/2002 | Krishna | ................ | G06F 9/3879 713/161 |
| 2004/0205336 A1* | 10/2004 | Kessler et al. | ................ | 713/160 |
| 2008/0065885 A1* | 3/2008 | Nagai et al. | ................... | 713/168 |
| 2008/0130895 A1* | 6/2008 | Jueneman | ............ | H04L 9/3066 380/277 |
| 2012/0060159 A1* | 3/2012 | Sydir et al. | ................... | 718/100 |
| 2014/0093069 A1* | 4/2014 | Wolrich et al. | ................. | 380/28 |

OTHER PUBLICATIONS

FIPS, PUB. "180-3." Secure Hash Standard (SHS) (2008).

* cited by examiner

*Primary Examiner* — Lisa Lewis
*Assistant Examiner* — Henry Tsang
(74) *Attorney, Agent, or Firm* — Liang & Cheng, PC (57) ABSTRACT

A computational engine may comprise a working memory configured to receive a first input message and a second input message, a context memory coupled with the working memory, wherein the context memory is configured to simultaneously store a first context corresponding to the first input message and a second context corresponding to the second input message, and a set of computational elements coupled with the working memory and coupled with the context memory, wherein the set of computational elements is configured to finish generating a first output digest based on the first input message and a first context after starting generation of a second output digest based the second input message and a second context and before finishing the generation of the second output digest.

20 Claims, 7 Drawing Sheets

VIRTUALIZED SHA COMPUTATIONAL ENGINE

TECHNICAL FIELD

This disclosure relates to the field of encryption and, in particular, to a computational engine for performing cryptographic operations.

BACKGROUND

In addition to a central processing unit (CPU), a computer system may in some cases utilize a coprocessor for performing additional functions. For example, a coprocessor may be used to perform such operations as floating point arithmetic, graphics operations, signal processing, string processing, encryption, compression, and interfacing with peripheral devices. Coprocessors may thus be optimized for performing specific types of calculations efficiently, and may increase overall system performance by offloading processor-intensive tasks from the CPU.

A coprocessor may be used to process a heterogeneous workload that may include several different types of computations, each having its own unique set of computational requirements, such as data size or processing time. A typical architecture may execute such heterogeneous workloads by relying on software management to execute multiple workloads sequentially using a single or multiple hardware engines. However, the different computational requirements presented by a heterogeneous workload may make it difficult to execute using such a system; different computational (data) sizes or computational time may add significant complexity as compared to homogeneous workloads.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

One embodiment of an architecture for managing a heterogeneous workload that presents multiple data streams for computation may allow such multiple data streams to be processed concurrently without external supervision by a processor or host system. Specifically, the data streams may be processed by functions executing concurrently on multiple hardware engines. In one embodiment, the hardware engines may be fixed-function engines (FFEs) that are optimized for performing specific functions or sets of calculations.

In one embodiment, a FFE may be a computational engine that is capable of switching between different modes of a certain type of task; for example a Secure Hash Algorithm (SHA) engine may be capable of switching between multiple SHA hash functions, such as SHA-1, SHA-224, SHA-256, and HMAC, for example. In one embodiment, a computational engine may include a set of computational elements for which at least some of the computational elements are used to implement more than one of the multiple hash functions.

In one embodiment, a computational engine may generate an output digest from an input message by performing a sequence of SHA cryptographic operations on the input message data. In one embodiment, these cryptographic operations may be performed as a series of computations upon 64-byte data segments of the input message, where an intermediate value calculated based on one data segment may be used to calculate a result for a successive data segment. An embodiment of a computational engine may thus include an internal context memory that can be updated and maintained between successive data segments, allowing the computational engine to switch between the processing of different input messages. For example, the computational engine may store in the context memory an intermediate value generated based on a first data segment of a first message, switch to processing a data segment of a second message, then restore the previously stored intermediate value when resuming processing of the next data segment of the first message.

In one embodiment, the computational engine may include a set of computational elements, such as adders, registers, multiplexers, or other components each configured to execute one or more cryptographic operations in a sequence of operations for implementing a cryptographic hash function. Such a computational engine may support multiple hash functions by selecting, for each of the supported hash functions, a different computational pathway through a subset of the computational elements.

Figure 1:
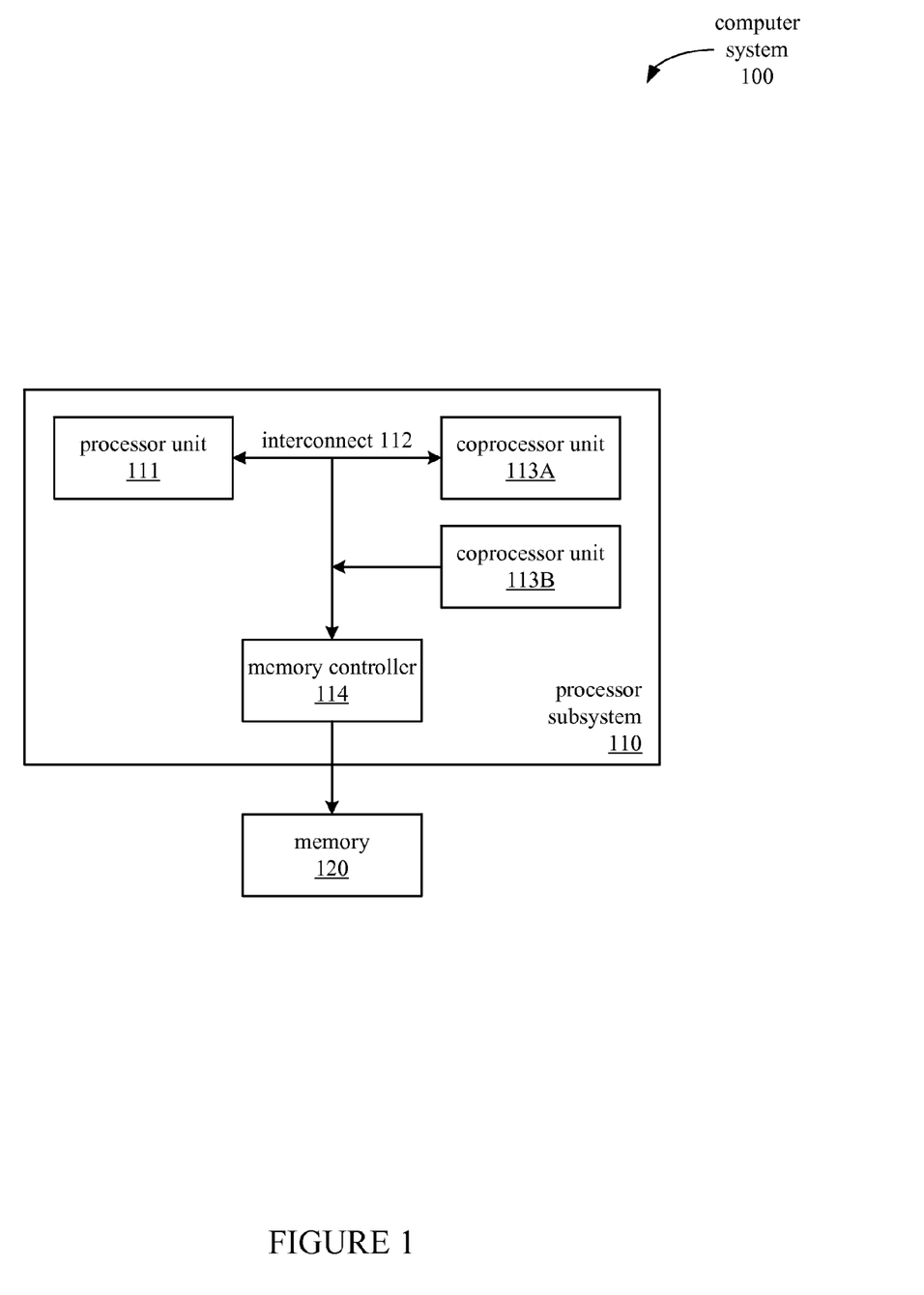
FIG. 1 illustrates an embodiment of a computer system.

FIG. 1 illustrates an embodiment of a computer system 100 which may implement a workload management architecture with one or more computational engines, as described above. Computer system 100 may include a processor subsystem 110 coupled with memory 120. Computer system 100 may be any of various types of devices, including, but not limited to, a personal computer system, desktop computer, laptop or notebook computer, mainframe computer system, handheld computer, workstation, network computer, a consumer device such as a mobile phone, pager, or personal data assistant (PDA). Computer system 100 may also be any type of networked peripheral device such as storage devices, switches, modems, routers, etc. Although a single computer system 100 is shown in FIG. 1 for convenience, system 100 may also be implemented as two or more computer systems operating together.

In one embodiment, processor subsystem 110 may include one or more processors or processing units. For example, processor subsystem 110 may include one or more processor units, such as processor unit 111, that are coupled to one or more coprocessor units (e.g., coprocessor units 113A and 113B). In various embodiments, processor subsystem 110 (or each processor unit within 110) may contain a cache or other form of on-board memory.

Memory 120 is coupled with processor subsystem 110 and is usable by processor subsystem 110. Memory 120 may be implemented using different physical memory media, such as hard disk storage, floppy disk storage, removable disk storage, flash memory, random access memory (RAM-SRAM, EDO RAM, SDRAM, DDR SDRAM, etc.), read-only memory (PROM, EEPROM, etc.), and so on. In one embodiment, the available memory in computer system 100 is not limited to memory 120. Rather, computer system 100 may be said to have a "memory subsystem" that includes various types/locations of memory. For example, the memory subsystem of computer system 100 may, in one embodiment, include memory 120, cache memory in processor subsystem 110, and storage on various I/O devices (e.g., a hard drive, storage array, etc.). Thus, the phrase "memory subsystem" may represent various types of possible memory media that can be accessed by computer system 100. In some embodiments, the memory subsystem stores program instructions executable by processor subsystem 110.

Processor subsystem 110 includes a processor unit 111, coprocessor units 113A and 113B, and a memory controller 114, all coupled together via an interconnect 112 (e.g., a point-to-point or shared bus circuit). In one embodiment, processor unit 111 and coprocessor units 113A and 113B may be located on the same die. In an alternative embodiment, processor unit 111 and coprocessor units 113A and 113B may be located on separate dies. In one embodiment, coprocessor unit 113B and memory controller 114 may be omitted from the processor subsystem 110. For example, processor unit 111 may be coupled only to a single coprocessor unit (e.g., 113A); alternatively, processor unit 111 may be coupled to multiple coprocessor units (e.g., 113A and 113B). Additional coprocessor units may be possible in other embodiments. In various embodiments, processor unit 111 and coprocessor units 113A and 113B may share a common memory controller 114. Memory controller 114 may be configured, for example, to access a main system memory (e.g., memory 120). In other embodiments, each processor unit 111 and coprocessor units 113A and 113B may be coupled to respective memory controllers.

In one embodiment, processor unit 111 is a general-purpose processor unit (e.g., a central processing unit (CPU)) that may include one or more execution units. Alternatively, unit 111 may be a special-purpose processor such as a graphics processor. In one embodiment, processor unit 111 may be configured to execute instructions fetched from memory 120 using memory controller 114. The architecture of unit 111 may have various features; for example, it may be pipelined. In other embodiments, processor unit 111 may implement a multithreaded architecture for simultaneously executing multiple threads. Processor unit 111 may execute, without limitation, application-specific instructions as well as operating system instructions. These instructions may allow the implementation of any number of features, including, as just one example, virtual memory.

In one embodiment, processor unit 111 maybe coupled as a companion processor to one or more coprocessor units 113A and 113B, permitting unit 111 to provide instructions to coprocessor units 113A and 113B. Instructions provided by processor unit 111 to coprocessor units 113A and 113B may be within a common instruction stream (i.e., unit 111 fetches instructions to execute and provides certain of those fetched instructions to unit 113A and 113B for execution). Certain instructions provided from processor unit 111 to coprocessor unit(s) 113A and 113B may be "control" instructions generated by a functional unit within processor unit 111 to control the operation of coprocessor unit(s) 113A and 113B.

In one embodiment, coprocessor units 113A and 113B may be used to help perform the work of processor unit 111. As with processor unit 111, coprocessor units 113A and 113B are not limited to any particular function or architecture. In various embodiments, coprocessor units 113A and 113B may be general-purpose or special-purpose processors (e.g, graphics processor units (GPU), video decoding processors, encryption processors, queue managers, etc.). In one embodiment, coprocessor units 113A and 113B may be implemented as a field-programmable gate array (FPGA). In some embodiments, coprocessor units 113A and 113B may be pipelined. Coprocessor units 113A and 113B may, in some embodiments, employ a multithreaded architecture. In various embodiments, coprocessor units 113A and 113B may be configured to execute microcode instructions in order to perform certain instructions received from unit 111. In certain embodiments, coprocessor units 113A and 113B may support the use of virtual memory.

In one embodiment, interconnect 112 may be a shared bus circuit that couples processor unit 111 to coprocessor units 113A and 113B. In one embodiment, interconnect 112 may implement a "virtual tunnel" that allows processor unit 111 to communicate with coprocessor units 113A and 113B via a packet-based protocol such as Hyper Transport or PCI-Express. In some embodiments, interconnect 112 may be a front-side bus. In one embodiment, coprocessor units 113A and 113B may be coupled to processor unit 111 through a Northbridge-type device.

In one embodiment, memory controller 114 is configured to provide an interface for processor unit 111 and/or coprocessor units 113A and 113B to access memory (e.g., memory 120). Memory controller 114 may be used, for example, to fetch instructions or to load and store data. In one embodiment, processor unit 111 may use memory controller 114 to fetch instructions for execution in processor unit 111 or coprocessor units 113A and 113B. In another embodiment, a coprocessor unit 113A or 113B may use memory controller 114 to fetch its own instructions or data.

Figure 2:
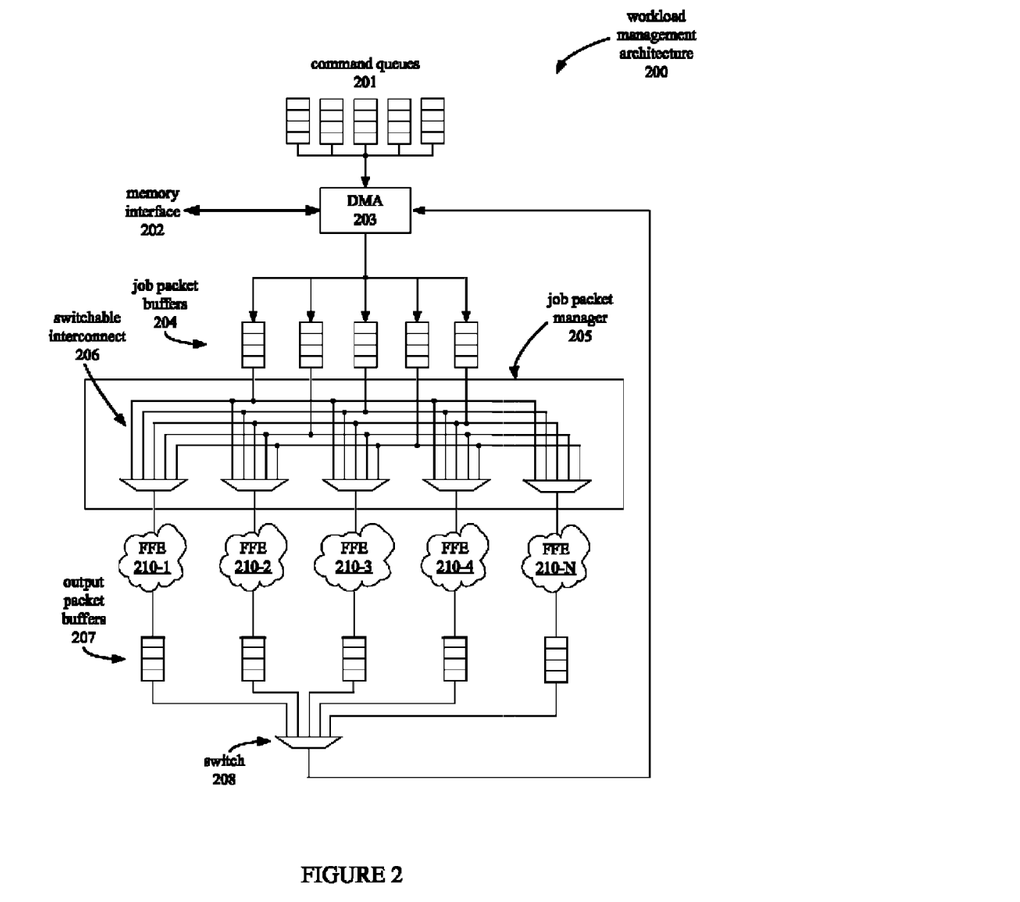
FIG. 2 illustrates an embodiment of a workload management architecture.

FIG. 2 illustrates a workload management architecture 200, according to an embodiment, which may be implemented in a coprocessor such as coprocessor unit 113A or 113B, and which may include one or more computational engines, such as fixed function engines (FFEs) 210-1 to 210-N. In alternative embodiments, the workload management architecture 200 is not limited to coprocessor implementations, and may be implemented in other types of processors or devices; for example, the architecture 200 may be implemented in a processor unit such as processor unit 111 in a processor subsystem 110 that may or may not include coprocessor units 113A and 113B. In one embodiment, the workload management architecture may be implemented in a single block of a single integrated circuit chip.

In one embodiment, the architecture 200 may include a set of command queues 201, which are coupled with an input of a direct memory access (DMA) block 203. In one embodiment, the DMA block 203 may be further coupled with a number of job packet buffers 204, which are in turn coupled with a job packet manager 205. The job packet manager 205 may be coupled with each of a set of N fixed-function engines (FFEs) 210-1 to 210-N. Each of the FFEs may have an output connected to a corresponding output packet buffer 207. Each of the output packet buffers 207 is connected via a switch 208 to the DMA block 203. In one embodiment, the components of workload management architecture 200 may be constructed on the same semiconductor substrate. For example, the components, including the DMA block 203, the job packet manager 205, the FFEs 210, and other components may be constructed as part of a coprocessor on a single semiconductor chip.

In one embodiment, each of the command queues 201 is a data structure (such as a linked list, stack, table, etc.) or other memory that can be used to contain control information and data associated with one or more commands in a single workload. In one embodiment, a workload may reside in one and only one of the command queues 201 at a given time. Thus, with n command queues 201, the architecture 200 may support n simultaneous workloads. Each of the n workloads may be heterogeneous, homogeneous, or a combination of both heterogeneous and homogeneous workloads. In one embodiment, the command queues 201 may be implemented as first-in-first-out (FIFO) buffers.

In one embodiment, the DMA block 203 performs the fragmentation of the workload data into a stream of job packets and reassembling the resulting output stream in memory (via memory interface 202) after the job packets have been processed. In one embodiment, the command queues 201 may be coupled to the DMA block 203 such that the DMA block 203 can receive the workload data and control information from the command queues 201. The DMA block 203 may be configured to, in response to receiving the workload commands and workload data from the command queues 201, divide the workload data for each of the received commands into a number of job packets. In order to create a stream of job packets for a workload, the DMA may fetch and segment the input workload data, retrieve the control information for the workload, and combine these together into a job packet according to the specifications of specified FFEs which are to be used for processing the job packets.

In one embodiment, each of the commands in the workload may be associated with a particular FFE; for example, the command may indicate an FFE to be used for processing the workload data associated with the command. In one embodiment, the DMA block 203 may identify the particular FFE associated with the command based on control information, workload data, or some other indication. In response to identifying the FFE that is to process the data associated with the command, the DMA block 203 may then determine how to arrange the workload data and control information into a job packet according to a format that can be processed by the FFE.

For example, a job packet destined for an FFE that is configured to perform AES encryption may include a set of input data, an AES key, and a flag indicating whether encryption or decryption is to be performed by the FFE. The DMA block 203 may also add metadata to the job packet; for example, the job packet may include a header containing flags indicating whether the job packet is the first or last job packet of a command, or containing fields indicating the length of the data payload of the job packet.

In one embodiment, the DMA block 203 may also add a command queue identification (ID) tag to each job packet of a command identifying the command or the command queue from which the job packet originated. Such tagging may facilitate the processing of workstreams that include multiple commands.

In one embodiment, the DMA block 203 generates a series of job packets and stores the job packets in one or more job packet buffers 204. In one embodiment, the buffers 204 may be implemented using FIFO buffers.

In one embodiment, the workload management architecture 200 may also include a job packet manager 205 coupled with the job packet buffers 204. The job packet manager 205 may be configured to assign one or more of the job packets produced by the DMA block 203 and stored in the buffers 204 to one of the FFEs 210. Based on the assignment, the job packet manager 205 may retrieve job packets from the buffers 204 and transmit the job packets to the appropriate one of the FFEs 210 that is coupled with the job packet manager 205.

In one embodiment, the job packet manager 205 may transfer job packets via a switchable interconnect 206 that is coupled with the DMA block 203 directly or through buffers 204. The switchable interconnect 206 may thus couple the DMA block 203 to each of the FFEs 210, so that the job packets produced by the DMA block 203 can be distributed to the different FFEs 210. In one embodiment, the switchable interconnect 206 may be implemented as a cross-bar network.

In one embodiment, when one of the FFEs 210 has available space to accept a new job packet, the job packet manager 205 may arbitrate between the job packets queued in the buffers 204 to identify a job packet to send to the FFE. In one embodiment, priorities may be assigned to the commands in the workstream, the command queues, or to specific job packets to control the allocation of the FFEs' computational bandwidth when conflicts arise.

In one embodiment, when one of the command queues 201 has run out of data (underflowed) then the command queue may stall until more data has been stored in the command queue, and a job packet created from that data. The DMA block 203 may ignore the underflowed command queue and only arbitrate between command queues that have work packets ready to queue. In one embodiment, allocation of the FFEs' computational bandwidth may be performed on an arbitration cycle basis and may be based upon the priorities of just the command queues having job packets ready to be distributed to the FFEs 210.

Accordingly, each of the FFEs 210 may be configured to receive one or more of the job packets and generate one or more output packets based on the workload data in the received one or more job packets. For example, a FFE may receive a job packet, then perform a function on the workload data in the packet, in accord with control information or function parameters also contained within the job packet. The FFE may then generate an output packet containing the output data resulting from performing the function. In one embodiment, an FFE may generate one output packet for each job packet that is processed by the FFE.

In one embodiment, each of the FFEs 210 may include an input FIFO buffer for queuing job packets that have been assigned to the corresponding FFE. Thus, each input FIFO buffer queues job packets for a different one of the FFEs 210. In order to process a job packet, an FFE may receive the job packet in its input FIFO buffer, and may then process the job packet after processing any preceding job packets in the input FIFO buffer. In one embodiment, each FFE processes a single job packet at a time; however, the multiple FFEs 210 may process job packets in parallel.

In one embodiment, each of the FFEs 210 may include an arrangement of logic gates, memory cells, and/or other devices arranged to perform a specific calculation or function using the input data and other information in the job packets. Alternatively, the functions of the FFEs 210 may be implemented using software or firmware that is executed using a processor.

In one embodiment, each of the FFEs 210 may be configured to perform a different set of calculations from any of the other FFEs. For example, a first FFE 210-1 may perform a first set of calculations for AES encryption while a second FFE 210-2 performs a different set of calculations to implement SHA encryption. Alternatively, some of the FFEs 210 may be redundant, such that two or more of the FFEs 210 perform the same or similar function, or perform the same or similar sets of calculations.

In one embodiment, the time durations taken by each of the FFEs 210 to finish processing a job packet may vary. For example, FFE 210-1 may take less time to process a job packet than FFE 210-2.

In one embodiment, when processing job packets, each FFE may identify ordering information in the job packets and copy the ordering information into the corresponding output packets generated by the FFE. In one embodiment, the ordering information indicates the original order of the job packets, and further indicates an order in which the output data in the output packets is to be arranged when assembling the output data stream.

In one embodiment where the DMA block 203 has added to each job packet a command queue ID tag identifying the command queue from which the job packet originated, each FFE may be further configured to copy the tag from the job packet to its corresponding output packet. In one embodiment, the FFE copies the tag into the output packet when the FFE queues the output packet in one of the output packet buffers 207.

In one embodiment, each of the FFEs 210 may be coupled with one of a set of output packet buffers 207. Each of the output packet buffers 207 may be configured to receive the output packets generated by the FFEs 210 and queue the output packets prior to assembly into an output data stream. In one embodiment, the switch 208 may be used to selectively couple one of the output packet buffers 207 to the DMA block 203 so that the DMA block 203 can retrieve one or more output packets from the selected output packet buffer.

In one embodiment, the DMA block 203 may assemble the output data from the received output packets into an output data stream. In one embodiment, the DMA block 203 uses the command queue ID tag to identify output packets belonging to a particular command queue and to combine those packets together into an output buffer for the specified command queue.

The output packets may be assembled in an order indicated by the ordering information in one or more of the output packets. In one embodiment, the output data stream may include the payload data from the output data packets while excluding some or all of the metadata contained in the output data packets. In one embodiment, the output data stream may be stored in memory by the DMA via memory interface 202. For example, the output data may be stored in memory 120, illustrated in FIG. 1.

Figure 3A:
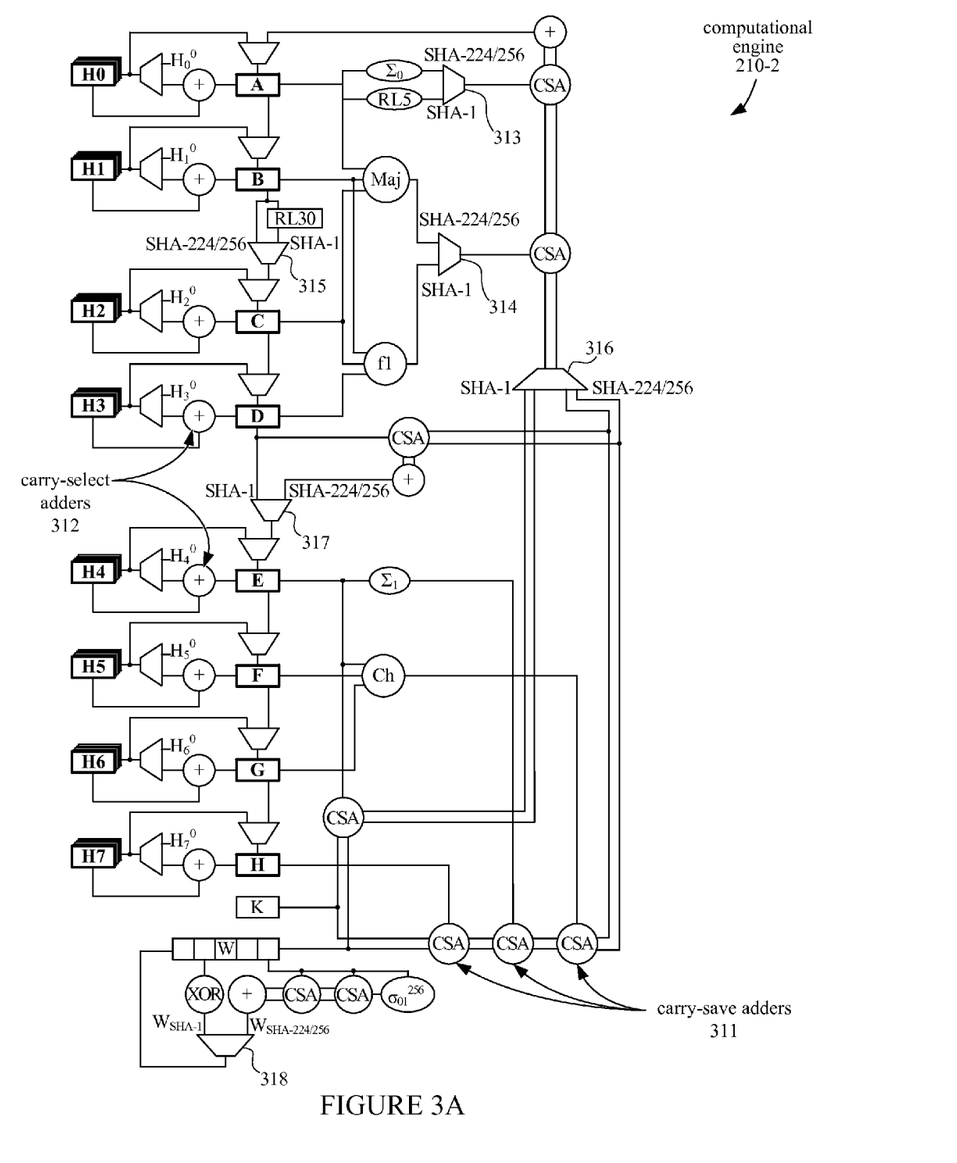
FIG. 3A illustrates an embodiment of a computational engine, according to an embodiment.

In one embodiment, a fixed function engine (FFE) may be a computational engine 210-2 as illustrated in FIG. 3A. In one embodiment, the computational engine 210-2 may be coupled with the job packet manager 205 of the workload management architecture 200, as illustrated in FIG. 2. The job packet manager 205 may distribute job packets to the computational engine 210-2, where the job packets may carry data from various commands from the different command queues 201. For example, the job packet manage 205 may transmit to the computational engine 210-2 a first job packet including data for executing a first command that is associated with a first command queue, and may subsequently transmit to the same computational engine 210-2 a second job packet including data for executing a second command that is associated with a second command queue.

In one embodiment, in addition to the payload data on which the computation is to be performed, the job packet may also include metadata that may indicate, for example, the command queue from which the job packet originated or a sequence in which the output data generated from the job packet is to be reassembled.

In one embodiment, the division of commands into job packets that can be processed individually allows a single computational engine 210-2 to begin processing data for a first command, then begin processing data for a second command before completing the first command. Accordingly, the computational engine may finish processing data for a first command after starting to process data for a second command and before completing the second command. In an embodiment where the computational engine 210-2 performs a hash function, the processing of data may correspond to the generation of an output digest based on input message data.

In one embodiment, the computational engine 210-2 may include a working memory. As illustrated in FIG. 3A, the working memory includes a set of working registers A-H for storing a set of working variables. In one embodiment, data from the input message to be encoded using a sequence of SHA cryptographic operations may be received as payload data in a set of job packets; this input data may be received and stored in the working memory. In one embodiment, the contents of the working memory may also be updated during the execution of the cryptographic operations by the computational engine 210-2.

In one embodiment, execution of a cryptographic hash function such as a SHA function may include repeated iterations of a particular sequence of cryptographic operations, which may operate on the contents of the working memory. In such an embodiment, the sequence of cryptographic operations may update the values stored in the working memory for each iteration. In other words, the sequence of cryptographic operations may, based on the data in the working memory, generate a new intermediate value that is written back into the working memory.

In one embodiment, the computational engine 210-2 may, over the course of multiple iterations, generate an output packet for each job packet received. The payload data in the output packet may be generated based on the input data stored in the working memory, including registers A-H, and based on the data stored in the context memory, which includes registers H0-H7. In one embodiment, the context memory H0-H7 may include a context corresponding to each command queue from which the engine 210-2 may receive a job packet. In one embodiment, each context includes an entry for each of the context registers H0-H7.

In one embodiment, the sequence of cryptographic operations may also operate on data stored in a context. Maintaining multiple contexts allows the computational engine 210-2 to switch between executing multiple commands specifying different functions or modes. For example, the computational engine 210-2 may support a number of different SHA hash functions, and may be capable of switching back and forth between a first command requesting execution of a first hash function and a second command requesting execution of a second hash function. For example, the engine 210-2 may switch back and forth between processing a first input message according to a SHA-1 hash function and a second input message according to a SHA-224 hash function. In one embodiment, maintaining multiple contexts also allows the computational engine 210-2 to switch between different commands specifying the same hash function. For example, the engine 210-2 may switch back and forth between processing a first input message according to a SHA hash function and a second input message according to the same SHA hash function.

In one embodiment, each command may individually specify a hash function to be used for processing the data associated with the command. For example, a command may specify that a particular input message associated with the command is to be processed using a SHA-1 hash function; thus, the set of job packets for the command may include metadata directing the computational engine 210-2 to use the SHA-1 mode to process the input message. In an alternative embodiment, the hash function to be used may be indicated elsewhere; for example, the computational engine 210-2 may determine the mode based on the command queue identifier of the input job packets, or based on the command.

Figure 3B:
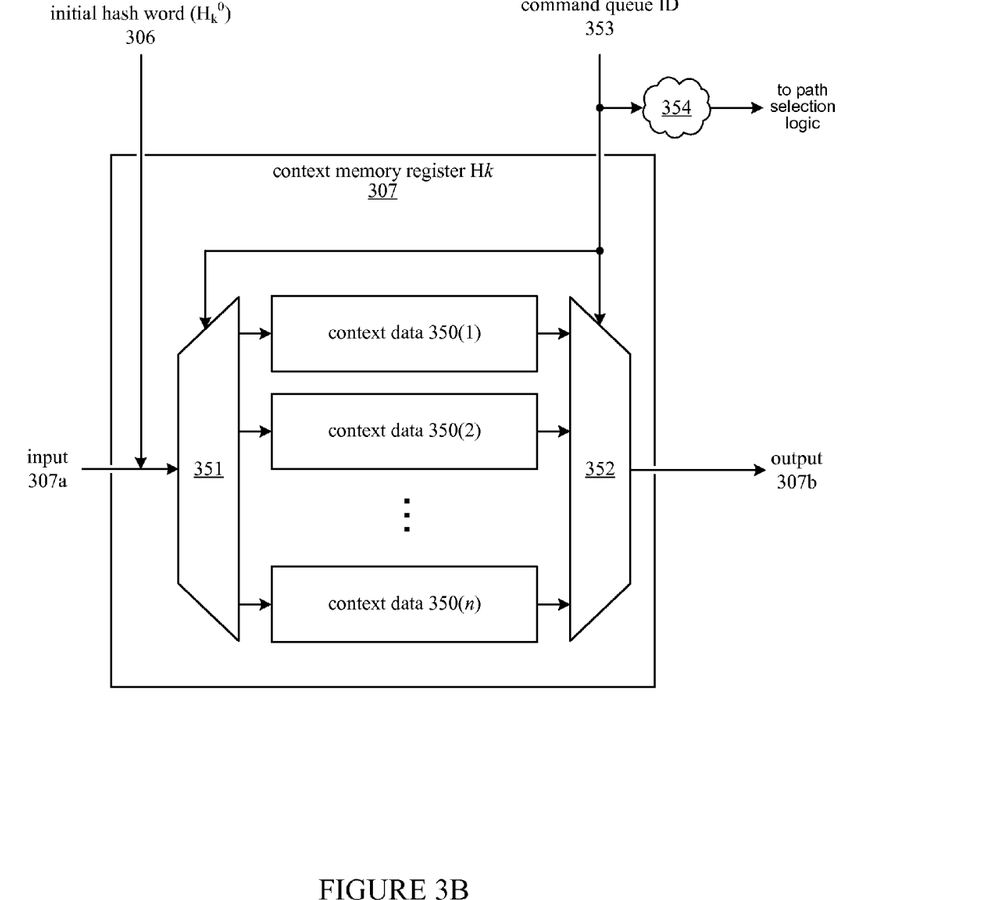
FIG. 3B illustrates an embodiment of a context memory register, according to an embodiment.

FIG. 3B illustrates an embodiment of a context memory register 307 of a computational engine 210-2. In one embodiment, the context memory register 307 Hk may correspond to one of the context registers H0-H7, where k is one of the index numbers 0-7. As illustrated in FIG. 3B, the context memory register 307 stores context data segments 350(1)-350(n), each of which represents a portion of the entire context. Each of the context data segments 350(1)-350(n) may correspond to one of n command queues, such as command queues 201. Each of these contexts may store, for example, one or more intermediate hash values or final hash values generated by the execution of a sequence of cryptographic operations on workload data from the corresponding command queue. In one embodiment, an intermediate hash value may be a value generated by an iteration of a sequence of cryptographic operations for processing a block of data using one of the supported SHA hash functions.

In one embodiment, the context memory register 307 may include context selection logic including demultiplexer 351 and multiplexer 352 for selecting a current context data segment out of the context data segments 350 based on the command queue identifier of the current job packet. In one embodiment, each of the context data segments 350 is a word of an intermediate hash value. In one embodiment, the context selection logic 351 and 352 may select a different context for each unique command queue. In one embodiment, the selection may be maintained for the duration of execution of the sequence of cryptographic operations on the current job packet. In one embodiment, the selection logic 351 and 352 may maintain the selection for at least the time during which the context memory 307 is being accessed.

Some SHA functions may use an initial hash value when beginning processing of a new input message. Thus, in one embodiment, an initial hash word $H_{k^0}$ 306 of the initial hash value may be connected to the input 307a of the context memory; different initial hash words may be stored in one or more of the context data segments 350. The initial values $H_0^0$-$H_7^0$ make up an initial hash value. In one embodiment, the initial hash value, including hash word $H_{k^0}$ 306, may be used to introduce initial "nothing up my sleeve numbers" for starting a SHA process. As illustrated in FIG. 3A, the each of the initial hash words $H_0^0$-$H_7^0$ may be stored in one of the respective context registers H0-H7 via a multiplexer.

In one embodiment, the context selection logic 351 and 352 may select a current context by coupling the appropriate context data segment 350 with an input 307a and an output 307b, respectively, of the context memory register 307. In one embodiment, the context selection logic 351 and 352 may select a current context in response to receiving a command queue ID 353 of a packet currently being processed by the computational engine 201-2 at the time of the selection, and may select a context corresponding to the received command queue ID 353.

In one embodiment, the working memory may be coupled with the context memory so that data can be copied from the working memory to the context memory, or from the context memory to the working memory. In one embodiment, the computational engine 210-2 may, when switching jobs, copy data for the current job from the working memory to the context memory. In one embodiment, the computational engine 210-2 may switch jobs in response to receiving a job packet for a different command than the previously processed job packet.

In one embodiment, the command queue ID 353 may additionally be processed by logic 354 and used to control computational elements having path selection logic to select a computational pathway for implementing the appropriate hash function for the packet being processed. In one embodiment, the logic 354 may include memory and other logic for correlating the received command queue ID 353 with the appropriate hash function mode, and for generating the signals to switch the path selection logic elements accordingly.

In one embodiment, a computational engine 210-2 implementing a hash function such as a SHA hash function may generate an intermediate hash value for each iteration of a sequence of cryptographic operations, then use the generated intermediate hash value in a subsequent iteration of the sequence of cryptographic operations. In one embodiment, these intermediate hash values may thus be stored in a context so they can be retrieved when they are to be used for performing the subsequent iteration.

In one embodiment, the context memory of computational engine 210-2 may thus simultaneously store multiple intermediate hash values corresponding to multiple ongoing hash function computations. For example, a context memory may store a first context including an intermediate hash value to be used for calculating an output digest for a first input message, while simultaneously storing a second context including another intermediate hash value to be used for calculating an output digest for a second input message.

In one embodiment, the contexts stored in the context memory may be accessible to processes external to the computational engine 210-2. In one embodiment, such an external process may be software capable of saving and restoring individual contexts. In one embodiment, such software may be used to further increase the number of commands that may be simultaneously pending by allowing multiple commands or multiple command queues to use a single context.

With reference back to FIG. 3A, the computational engine 210-2 may further include a set of computational elements coupled with the working memory, including working registers A-H, and coupled with the context memory, including context registers H0-H7. In one embodiment, each of the computational elements may be coupled with at least another computational element in the set of computational elements. In one embodiment, each of the computational elements in the set of computational elements is configured to execute one or more cryptographic operations for implementing one or more of the supported hash functions of the computational engine 210-2. As illustrated in FIG. 3A, the set of computational elements may include elements such as carry-save adders (CSA) 311, carry-select adders 312, and multiplexers 313, 314, 315, 316, 317, and 318 among others.

In one embodiment, some of the computational elements may be function blocks that are configured to perform one or more cryptographic operations. For example, the Ch function block may perform the function Ch(x, y, z) and the Maj function block may perform the function Maj(x, y, z), as described in the Federal Information Processing Standards Publication (FIPS, PUB) "180-3" Secure Hash Standard (SHS) (2008). The set of computational elements may also include $\Sigma_1$ and $\Sigma_0$ function blocks, and a $\sigma_{01}{}^{256}$ function blocks. Other computational elements may perform various cryptographic operations used by one or more of the SHA hash functions; for example, the RL5 block may perform a left bit rotation by 5 bits, the RL30 block may perform a left bit rotation by 30 bits, the XOR block may perform an exclusive OR operation, and the function block f1 may perform a nonlinear function that varies. The set of computational elements may also include blocks that provide values, such as the K constant block and the W message schedule block.

In one embodiment, the set of computational elements may be configurable to implement any of a number of supported hash functions for generating an output digest from an input message. In one embodiment, some of the computational elements may include path selection logic, which may be used to select a computational pathway for implementing a particular supported hash function. For example, the computational elements 313, 314, 315, 316, 317, and 318 are multiplexers that may be used to selectively connect together a particular subset of computational elements. In one embodiment, each of the selected computational pathways may include multiple branches, and is not necessarily limited to a single branch or loop.

In one embodiment, the computational elements having path selection logic may switch in response to metadata, such as a command queue identifier 353 of a job packet being processed. In one embodiment, for each hash function supported by the computational engine, the path selection logic is configured to select a computational pathway that includes the computational elements for executing the appropriate sequence of cryptographic operations for implementing the hash function.

In one embodiment, the computational pathways corresponding to different hash functions may overlap; that is, two different hash functions may include one or more of the same computational elements in their respective computational pathways. For example, the K value block may provide a K value to be used in both of the SHA-1 and SHA-224/256 modes; thus, the computational pathways for these modes may both include the K block.

In one embodiment, the hash functions supported by the computational engine 210-2 may include one or more National Institute of Standards and Technology (NIST) approved Secure Hash Algorithm (SHA) functions. For example, functions supported by the computational engine 210-2 may include SHA-1, SHA-224, SHA-256, and HMAC functions.

Figure 4:
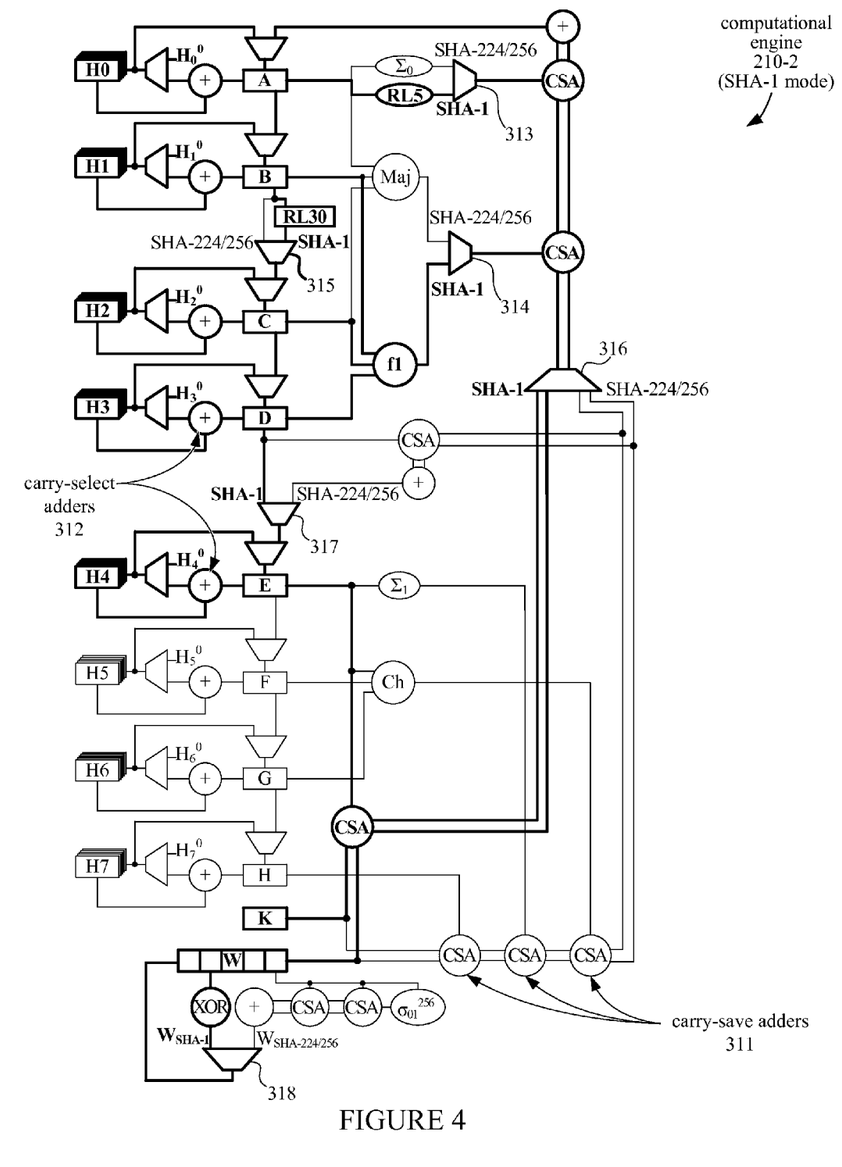
FIG. 4 illustrates a computational pathway for implementing a SHA-1 hash function in a computational engine, according to an embodiment.

FIG. 4 illustrates the computational engine 210-2 with a selected computational pathway for implementing a SHA-1 hash function, according to one embodiment. The selected computational pathway and the computational elements in the pathway are illustrated in bold lines in FIG. 4. In one embodiment, the SHA-1 function is implemented by including the context registers H0-H4 and the working registers A-E in the selected computational pathway. In one embodiment, each of the context registers and working registers may be a 32 bit register; thus, the five working registers A-E may be used with the context registers to generate a 160 bit output digest.

In one embodiment, the computational pathway for implementing the SHA-1 mode may be selected by the path selection logic of elements 313, 314, 315, 316, 317, and 318. The configuration of the path selection logic elements may determine whether a particular computational element is included in the selected computational pathway. For example, multiplexer 314 may be used to include the f1 function block in the computational pathway for use in the SHA-1 mode while excluding the Maj function block, which is not used in the SHA-1 mode. Similarly, the multiplexer 315 may include the RL30 block in the computational pathway for the SHA-1 mode and may exclude it from the computational pathways for other modes where it is not used.

Figure 5:
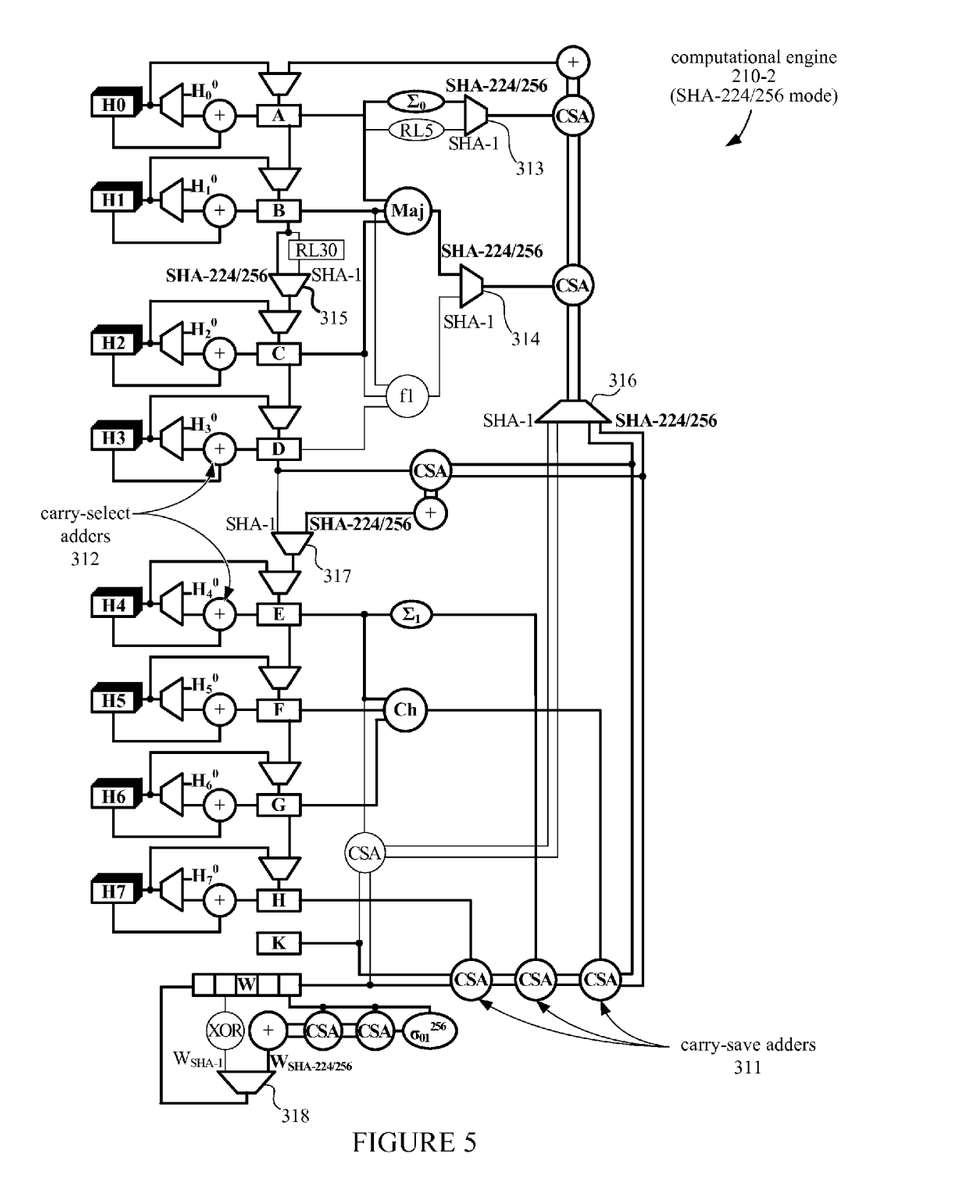
FIG. 5 illustrates a computational pathway for implementing a SHA 224/256 hash function in a computational engine, according to an embodiment.

FIG. 5 illustrates the computational engine 210-2 with a selected computational pathway for implementing the SHA-224 and SHA-256 hash functions, according to one embodiment. The selected computational pathway and the computational elements in the pathway are illustrated in bold lines in FIG. 5. In one embodiment, the SHA-224 and SHA-256 functions are implemented by including the context registers H0-H7 and the working registers A-H in the selected computational pathway. In one embodiment, each of the context registers and working registers may be a 32 bit register.

In one embodiment, the computational pathway for implementing the SHA-224 and SHA-256 functions may be selected by the path selection logic of elements 313, 314, 315, 316, 317, and 318. The configuration of the path selection logic elements may determine whether a particular computational element is included in the selected computational pathway. For example, multiplexer 314 may be used to include the Maj function block in the computational pathway for use in the SHA-224 and SHA 256 modes while excluding the f1 function block, which is not used in these modes. Similarly, the multiplexer 315 may exclude the RL30 block from the computational pathway for the SHA-224 and SHA-256 modes.

Figure 6:
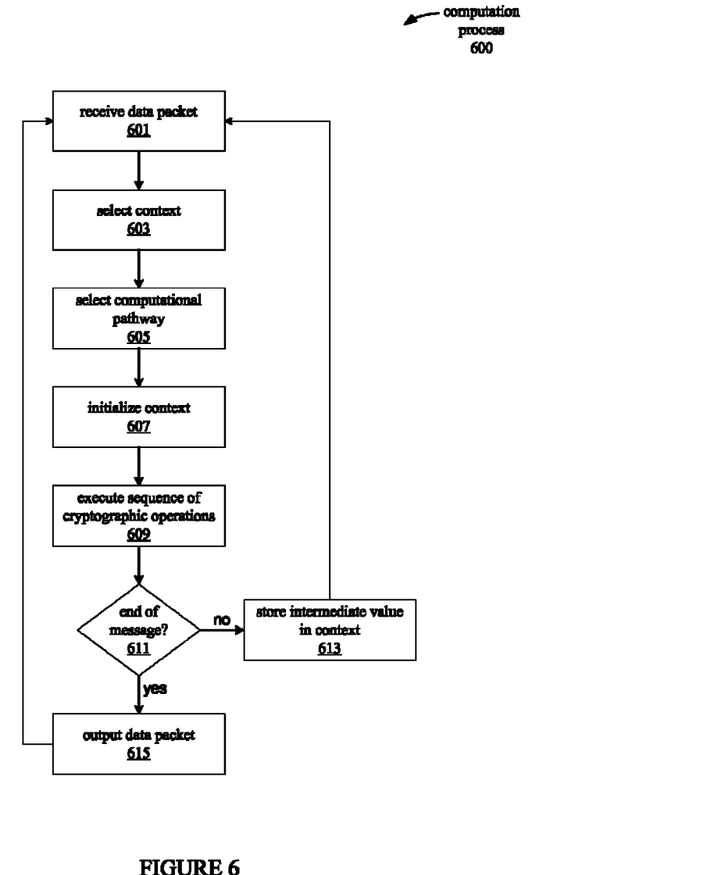
FIG. 6 is a flow diagram illustrating an embodiment of a computation process.

FIG. 6 illustrates a computation process 600, according to an embodiment. In one embodiment, the operations of process 600 may be performed by a computational engine, such as computational engine 210-2, to implement a hash function for generating an output digest from an input message.

In one embodiment, the process 600 begins at block 601. At block 601, the computational engine 210-2 may receive a data packet. In one embodiment, the data packet may be a job packet that is received and stored in the working memory, including one or more of registers A-H of the computational engine 210-2. The data packet may include both payload data and metadata. In one embodiment, the payload data may include data from an input message on which a cryptographic hash is to be performed by the engine 210-2. The metadata in the data packet may include information such as a command queue identifier that identifies one of the command queues 201 from which the data packet originates, and may also include information indicating the order in which the output data generated from the data packet should be placed in the output data stream. From block 601, the process 600 continues at block 603.

At block 603, the computational engine 210-2 may select a context by selecting one of the context data entries 350 for each context memory register Hk 307, as illustrated in FIG. 3B. In one embodiment, the selected context may include the selected context data entries for each of the context memory registers H0-H7. In one embodiment, the context may be selected based on the command queue identifier 353 of the data packet being processed. For example, with reference to FIG. 3B, the command queue ID 353 may be used to control the context selection logic 351 and 352 to select one of the context data entries 350 by connecting the entry with the input 307a and the output 307b of the context memory 307 so that data may be stored in and retrieved from the selected context.

In one embodiment, the context memory may be copied from the context memory to the working memory. In one embodiment, the set of context data entries 350 may include a data entry for each of the command queues 201. For example, if a command queue identifier 353 identifies command queue '2', the context selection logic 351 and 352 may select a corresponding entry 350(2). The context selection process may thus include selecting the corresponding entry within each of the context registers H0-H7. In one embodiment, the context may remain selected for the duration of the execution of the sequence of cryptographic operations; alternatively, the context may remain selected at least long enough to transfer the context data into the working memory. From block 603, the process 600 continues at block 605.

At block 605, the computational engine 210-2 may select a subset of computational elements in a computational pathway. In one embodiment, the selection of the subset of computational elements may depend on the command queue identifier 353. With reference to FIG. 3B, the command queue identifier 353 may be transmitted to logic 354, which generates the appropriate signals for controlling the computational elements having path selection logic.

In alternative embodiments, the hash function to be used may be identified based on metadata other than the command queue identifier 353; for example, the selected hash function may correspond to a specific command within the command queue, rather than the command queue itself. In an alternative embodiment, the cipher mode may be switched based on timing information or other external signals that are not transmitted as part of the data packet.

In one embodiment, the computational elements having path selection logic that are used to select the computational pathway may include, for example, multiplexers 313, 314, 315, 316, 317, and 318; thus, the logic 354 may identify the hash function to be executed based on the received command queue identifier 353, then cause the multiplexers 313, 314, 315, 316, 317, and 318 to couple together the selected subset of computational elements that will be used to perform the sequence of cryptographic operations for implementing the identified cipher mode. FIGS. 4 and 5 illustrate computational pathways that may be selected for implementing the SHA-1 and SHA-224/256 hash functions in the computational engine 210-2. From block 605, the process 600 continues at block 607.

At block 607, the computational engine 210-2 may initialize the context memory using a set of initial hash words $H_0^0$-$H_7^0$. In one embodiment, the initialization may occur in response to the first data packet to be processed for a particular input message. From block 607, the process 600 continues at block 609.

At block 609, the after selecting the computational pathway, the computational engine 210-2 may use the computational elements in the selected pathway to execute a sequence of cryptographic operations for generating an output digest from the input message according to a particular hash function. In one embodiment, each of the computational elements in the selected pathway performs one or more of the cryptographic operations. For example, the Ch and Maj function blocks are computational elements used to perform the Ch and Maj functions, respectively, which include cryptographic operations as defined in FIPS PUB 180-3.

In one embodiment, the computational elements in the selected pathway generate intermediate values and eventually final output data in the working registers by executing the sequence of cryptographic operations on the input data. In one embodiment, the input data may be the payload data of an input data packet, and the final output data may be the payload data in an output data packet.

During the execution of the sequence of cryptographic operations at block 609, the computational engine may generate one or more intermediate values. For example, execution of a SHA hash function may include repeated iterations of a particular sequence of cryptographic operations, with each iteration yielding an intermediate hash value that may be used in subsequent iterations. In one embodiment, each iteration may be performed on a portion of an input message, with subsequent iterations performed on subsequent portions of the input message. From block 609, the process 600 continues at block 611.

At block 611, for an embodiment where the input message to be processed is divided into a set of data packets, the process 600 may determine whether the data packet being processed is the last data packet of the input message. In one embodiment where a data packet is processed for each iteration of the hash function, an intermediate value may be copied from the working memory to the context memory for use in a subsequent iteration if the end of the input message has not been reached, as provided at block 613.

Thus, the computational engine 210-2 may store the intermediate hash values in a context to be retrieved later for a subsequent iteration. In one embodiment, the computational engine 210-2 may store the intermediate hash values by copying the values from the working memory to the context memory. In one embodiment, multiple such intermediate values may be stored simultaneously in the context memory, each in a different context corresponding to a different command queue.

If, at block 611, the end of the input message has been reached, then the data in the working memory may be output in the form of an output data packet, as provided at block 615. The output data packet may then be queued in one of the output packet buffers 207, as illustrated in FIG. 2, until it is reassembled with other output data packets into the final output digest for the input message. From block 613 or block 615, the process 600 may continue back to block 601.

In one embodiment, the processing of a subsequent second data packet may include the operations represented by blocks 601-615. At block 601, the computational engine 210-2 may receive the subsequent data packet, which may be a job packet from one of the command queues 201. In one embodiment, the data payload of the subsequent data packet may be received in the working memory. A context may be selected for processing the second data packet based on the command queue identifier of the packet, as provided at block 603. Accordingly, in one embodiment, if the subsequent second data packet is from a different command queue than the previous first packet, a different context may be selected for processing the second data packet.

In one embodiment, the context selection logic 351 and 352 may select the context by connecting the selected context to the set of computational elements, so it can be accessed by the computational elements. In some cases, the context selected for the second packet may include intermediate hash result values stored prior to the receiving and processing of the previous packet; these intermediate and/or final values may have been generated by a prior iteration of the same or a similar sequence of cryptographic operations of the same hash function to be used to process the second data packet. In one embodiment, the context may remain selected for the duration of the execution of the sequence of cryptographic operations.

At block 605, a computational pathway may be selected for processing the second data packet by coupling together each computational element in a subset of the computational elements. In one embodiment, the computational pathway may be selected based on the command queue identifier of the second packet. In one embodiment, if the hash function to be used for processing the second data packet is different from the hash function used to process the first data packet, then the computational pathways may differ. Otherwise, the computational pathway selected for the second data packet may be the same as for the first data packet if the same hash function is used to process both packets. In one embodiment, both of the first and second hash functions may be National Institute of Standards and Technology (NIST) approved SHA hash functions.

At block 607, a context may be initialized with an initial hash value including an number of initial hash words, such as initial hash word 306, for the second data packet. At block 609, the computational elements in the selected pathway may execute a sequence of cryptographic operations, including operations for implementing the selected hash function for the second data packet. In one embodiment, when the second data packet is associated with a different hash function than the first data packet, the computational pathways may differ; thus, the sequence of cryptographic operations performed by the elements in the computational pathways may also differ.

The computational elements in the selected pathway may generate an output data packet based on executing the sequence of cryptographic operations on the payload data of the second packet and on the stored context corresponding to the packet. If the end of the input message has not been reached, then intermediate hash values generated by this sequence of cryptographic operations may be stored in the context memory 307, in accord with blocks 613, so that they may be used in a subsequent iteration of the hash function; otherwise, the final hash result data generated from the input packet is output at block 1115 in the form of an output data packet.

In one embodiment, the process 600 may repeat blocks 601-615 to process a stream of input data packets, and may be capable of switching contexts and/or hash function modes for each sequential data packet that is processed. In one embodiment, each of multiple input messages may be divided into a set of input data packets to be received by the computational engine 210-2. Thus, in the example above, the first data packet to be processed may contain data from a first input message and the second subsequent data packet may contain data from a second different input message. In one embodiment, over the course of processing the multiple input messages, the computational engine may select a different computational pathway for each of the different supported hash functions that are used to process the multiple input messages.

In one embodiment, for each input message, the processing of the input message to generate the final output digest may begin when the first data packet for the input message is received by the computational engine 210-2, and may be completed when all of the data in the input message has been received and processed by the computational engine 210-2. Since the input messages may be divided into job packets that are independently scheduled, the completion of processing for input messages may be in the same order or a different order than the beginning of processing of the same input messages.

For example, processing of a first input message to generate a first output digest that is started either before or after the start of processing of a second input message to generate a second output digest may be completed before or after the second output digest is completed. In other words, a new input message may be started and finished before an already pending input message is completed, or the new input message may be finished after the pending input message is finished. The computational engine 210-2 may thus process job packets generated from heterogeneous workload data, as provided by the workload management architecture 200.

The embodiments described herein may include various operations. These operations may be performed by hardware components, software, firmware, or a combination thereof. As used herein, the terms "coupled to" or "coupled with" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computational engine 210-2 and/or portions thereof carried on the non-transitory computer-readable medium may be a database or other data structure which can be read by a program and used, directly or indirectly, to fabricate the hardware comprising the computational engine 210-2. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the computational engine 210-2. The netlist may then be placed and routed to produce a data set describing geometric shapes to be applied to masks. The masks may then be used in various semiconductor fabrication steps to produce a semiconductor circuit or circuits corresponding to the computational engine 210-2. Alternatively, the database on the non-transitory computer-readable medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader spirit and scope of the embodiments as set forth in the appended claims. The specification and drawings are, accordingly, to be regarded in an illustrative sense rather than a restrictive sense.

What is claimed is:

1. A hardware computational engine, comprising:
   a working memory configured to receive a first input message and a second input message;
   a plurality of switches coupled with the working memory and configured to transmit to the working memory the first input message, a first portion of the second input message, and a second portion of the second input message independently from the first portion;
   a context memory coupled with the working memory, wherein the context memory is configured to simultaneously store a first context corresponding to the first input message and a second context corresponding to the second input message; and
   a set of hardware computational elements coupled with the working memory and coupled with the context memory, wherein the set of hardware computational elements is configured to finish calculations for generating a first output digest based on the first input message and the first context after starting calculations for generating a second output digest based the second input message and the second context and before finishing the calculations for generating the second output digest.

2. The hardware computational engine of claim 1, wherein the working memory is configured to receive the first input message as a first set of input data packets, the first portion of the second input message as a second set of input data packets, and the second portion of the second input message as a third set of input data packets, and wherein the set of hardware computational elements is further configured to generate the first output digest by executing a first sequence of cryptographic operations on the first set of input data packets, and wherein the set of hardware computational elements is further configured to generate the second output digest by executing a second sequence of cryptographic operations on the second set of input data packets and the third set of input data packets.

3. The hardware computational engine of claim 2, wherein the context memory further comprises context selection logic configured to select the first context during execution of the first sequence of cryptographic operations and to select the second context during execution of the second sequence of cryptographic operations.

4. The hardware computational engine of claim 2, wherein each of the first set of data packets includes a command queue identifier that identifies a first command queue, wherein each of the second set of data packets includes a command queue identifier that identifies a second command queue different from the first command queue, and wherein the context memory is configured to:
   select the first context in response to receiving one of the command queue identifiers that identifies the first command queue, and
   select the second context in response to a receiving one of the command queue identifiers that identifies the second command queue.

5. The hardware computational engine of claim 1, wherein the first context comprises a first intermediate value generated by the execution of the first sequence of cryptographic operations, and wherein the second context comprises a second intermediate value generated by the execution of the second sequence of cryptographic operations.

6. The hardware computational engine of claim 1, wherein each computational element in the set of hardware computational elements is coupled with at least another computational element in the set of hardware computational elements, and wherein each of the hardware computational elements is configured to execute one or more cryptographic operations for generating at least one of the first output digest and the second output digest.

7. The hardware computational engine of claim 1, wherein one or more of the hardware computational elements in the set of hardware computational elements comprises path selection logic, wherein for each hash function of a plurality of hash functions supported by the computational engine, the path selection logic is configured to select a computational pathway corresponding to the hash function by coupling together a subset of the hardware computational elements.

8. The hardware computational engine of claim 7, wherein the plurality of hash functions supported by the computational engine includes a first hash function and a second hash function, and wherein a first computational pathway corresponding to the first hash function includes at least one computational element in common with a second computational pathway corresponding to the second hash function, wherein the plurality of hash functions supported by the computational engine includes one or more National Institute of Standards and Technology (NIST) approved Secure Hash Algorithm (SHA) functions.

9. A method, comprising:
   transmitting to a working memory via a plurality of switches a first input message;
   transmitting to the working memory via the plurality of switches a first portion of a second input message;
   transmitting to the working memory via the plurality of switches a second portion of the second input message independently from the first portion;

simultaneously storing a first context corresponding to the first input message and a second context corresponding to the second input message in a context memory; and finishing calculations for generating a first output digest in a set of hardware computational elements based on the first input message and the first context after starting calculations for generating second output digest based the second input message and the second context and before finishing the calculations for generating of the second output digest in the set of hardware computation elements.

10. The method of claim 9, wherein transmitting the first input message further comprises transmitting a first set of input data packets each including data from the first input message, wherein transmitting the first portion of the second input message further comprises transmitting a second set of input data packets, wherein transmitting the second portion of the second input message further comprises transmitting a third set of input data packets, and wherein each of the second and third sets of input data packets includes data from the second input message, the method further comprising:

generating the first output digest by executing a first sequence of cryptographic operations on the first set of input data packets; and generating the second output digest by executing a second sequence of cryptographic operations on the second set of input data packets and on the third set of input data packets.

11. The method of claim 10, further comprising:
selecting the first context from a plurality of contexts stored in the context memory in response to receiving a first command queue identifier from a first input data packet from the first set of input data packets; and
selecting the second context from the plurality of contexts stored in the context memory in response to receiving a second command queue identifier from a second data packet from the second set of input data packets.

12. The method of claim 9, further comprising:
generating a first intermediate value stored in the first context based on at least a portion of the first input message; and
generating a second intermediate value stored in the second context based on at least a portion of the second input message.

13. The method of claim 9, further comprising copying data from a working memory to the context memory.

14. The method of claim 9, further comprising:
generating the first output digest by executing a first sequence of cryptographic operations for implementing a first hash function; and
generating the second output digest by executing a second sequence of cryptographic operations for implementing a second hash function different from the first hash function, wherein the first hash function and the second hash function are National Institute of Standards and Technology (NIST) approved SHA hash functions.

15. The method of claim 9, further comprising, for each hash function of a plurality of supported hash functions, selecting a computational pathway by coupling together each computational element in a subset of hardware computational elements selected from the set of hardware computational elements.

16. A system, comprising:
a plurality of command queues each configured to store one or more commands;
a job packet manager comprising a plurality of switches coupled with the plurality of command queues; and
a computational engine coupled with the job packet manager, wherein the job packet manager is configured to distribute each of a first job packet and a second job packet to the computational engine, wherein the first job packet and the second job packet are associated with different commands, and wherein the computational engine comprises a set of hardware computational elements configured to finish calculations for generating a first output digest based on the first job packet and a first context after starting calculations for generating a second output digest based the second job packet and a second context and before completing the calculations for generating the second output digest.

17. The system of claim 16, wherein the computational engine further comprises:
a working memory coupled with the set of hardware computational elements, wherein the working memory is configured to receive the first job packet and the second job packet; and
a context memory coupled with the working memory, wherein the context memory is configured to simultaneously store the first context and the second context.

18. The system of claim 17, wherein the context memory further comprises context selection logic configured to select the first context in response to receiving a first command queue identifier from the first job packet and to select the second context in response to receiving a second command queue identifier from the second job packet.

19. The system of claim 16, wherein the set of hardware computational elements is further configured to generate the first output digest by executing a first sequence of cryptographic operations on each of a first set of input data packets including the first job packet, and wherein the set of hardware computational elements is further configured to generate the second output digest by executing a second sequence of cryptographic operations on each of a second set of input data packets including the second job packet, wherein the first context comprises a first intermediate value generated by the execution of the first sequence of cryptographic operations, and wherein the second context comprises a second intermediate value generated by the execution of the second sequence of cryptographic operations.

20. The system of claim 16, wherein each of the hardware computational elements in the set of hardware computational elements is configured to execute one or more cryptographic operations for generating at least one of the first output digest and the second output digest, and wherein one or more of the hardware computational elements comprises path selection logic, wherein for each hash function of a plurality of hash functions supported by the computational engine, the path selection logic is configured to select a computational pathway corresponding to the hash function by coupling together a subset of the hardware computational elements.

* * * * *